United States Patent [19]

Barcz et al.

[11] 4,132,933

[45] Jan. 2, 1979

[54] ELECTROMECHANICAL CHOPPER FOR SPEED CONTROL OF BATTERY POWERED DEVICES

[75] Inventors: James P. Barcz; James H. Bigelow, both of Milwaukee; James R. Jaeschke, Greendale; Earl T. Piber, Oconomowoc; Gordon B. Spellman, Mequon, all of Wis.

[73] Assignee: Cutler-Hammer, Inc., Milwaukee, Wis.

[21] Appl. No.: 754,072

[22] Filed: Dec. 23, 1976

[51] Int. Cl.$^2$ .............................................. H02P 5/10
[52] U.S. Cl. ...................................... 318/346; 318/17; 318/330
[58] Field of Search ................. 318/346, 330, 17, 519; 335/90, 96; 310/47, 50

[56] References Cited

U.S. PATENT DOCUMENTS

| Re. 24,308 | 4/1957 | Colegrove | 318/346 |
|---|---|---|---|
| 964,312 | 7/1910 | Pfanstiehl | 335/96 |
| 2,523,941 | 9/1950 | Charbonneaux | 335/90 |
| 2,744,176 | 5/1956 | Kaman | 310/50 |
| 2,747,153 | 5/1956 | Campbell | 318/346 |
| 2,934,621 | 4/1960 | Stewart | 335/90 |
| 3,304,482 | 2/1967 | Jenks et al. | 335/90 |
| 3,327,260 | 6/1957 | Murphy | 335/97 |
| 3,397,352 | 8/1968 | Woodward | 318/346 |
| 3,703,646 | 11/1972 | Jacyno | 310/47 |
| 3,721,879 | 3/1973 | Corey et al. | 310/50 |

*Primary Examiner*—David Smith, Jr.
*Attorney, Agent, or Firm*—Hugh R. Rather; William A. Autio; Michael E. Taken

[57] ABSTRACT

A chopper for adjustably controlling the average value of the voltage supplied from a D.C. battery source to a motor load for adjustable speed control. The chopper comprises manually-operable spring-biasing means for applying force to close a contact to energize the motor and electromagnetic means simultaneously energized for re-opening the contact. This occurs at a high repetition rate so that the average value of the voltage across the motor determines the motor speed. This average value of voltage is proportional to the closed-to-open time ratio of the contact and is adjustable by manual control. Two versions are disclosed. In the first version, the spring-biasing force is applied to the contact by depressing a trigger. In the second version, the spring-biasing force is applied to the contact by rotation of a knob. Both versions may use either tension or compression spring force.

22 Claims, 14 Drawing Figures

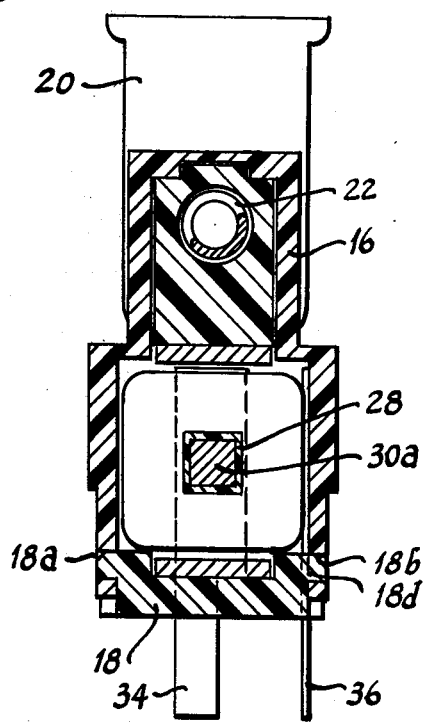
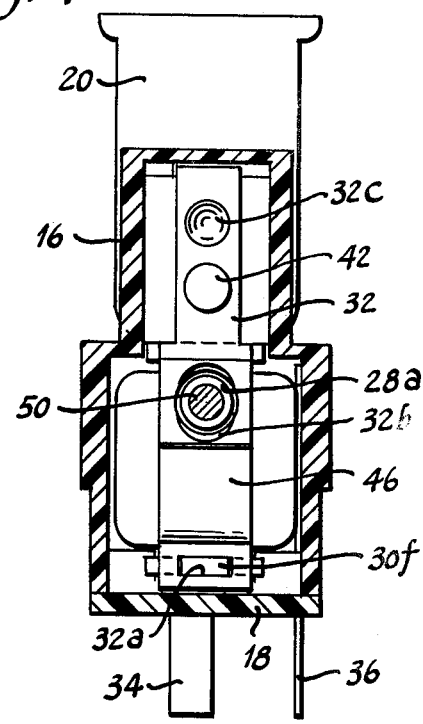
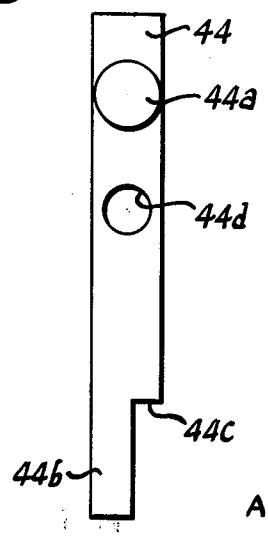
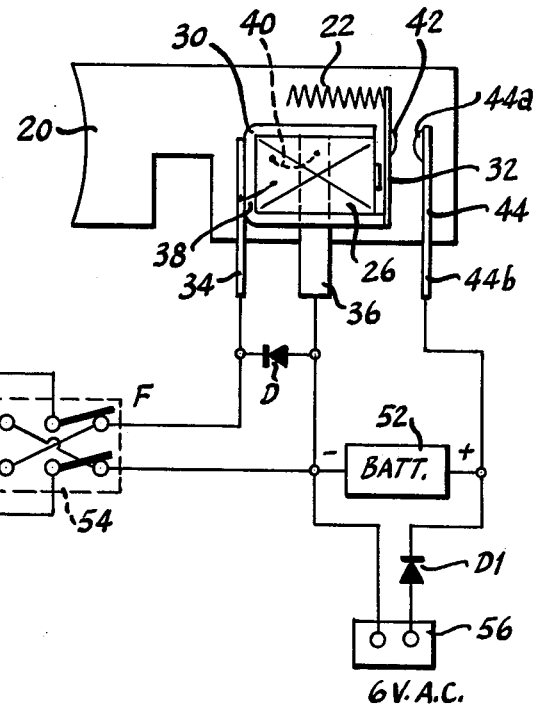

Fig. 7a
SMALL TRIGGER DEPRESSION
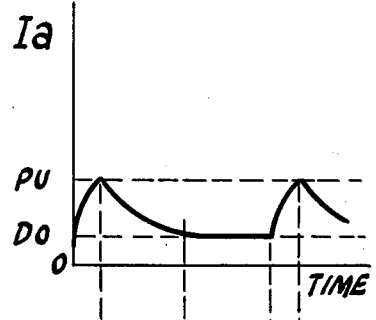
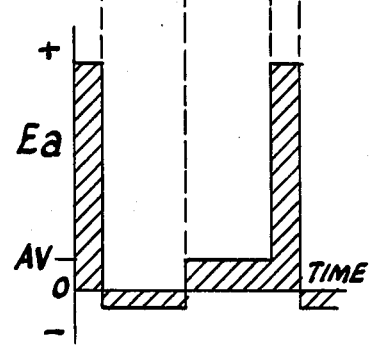
Fig. 7b
MEDIUM TRIGGER DEPRESSION
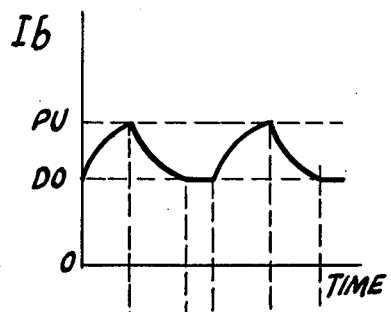
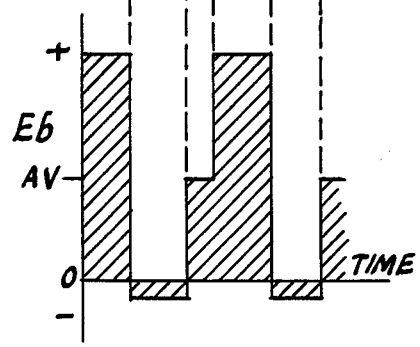
Fig. 7c
LARGE TRIGGER DEPRESSION
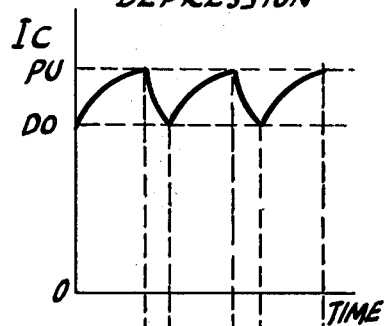
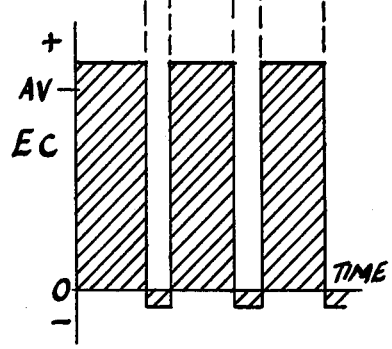
Fig. 12
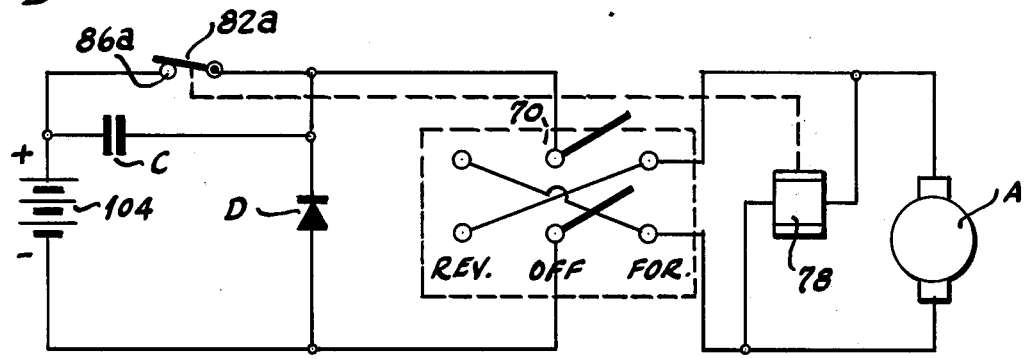

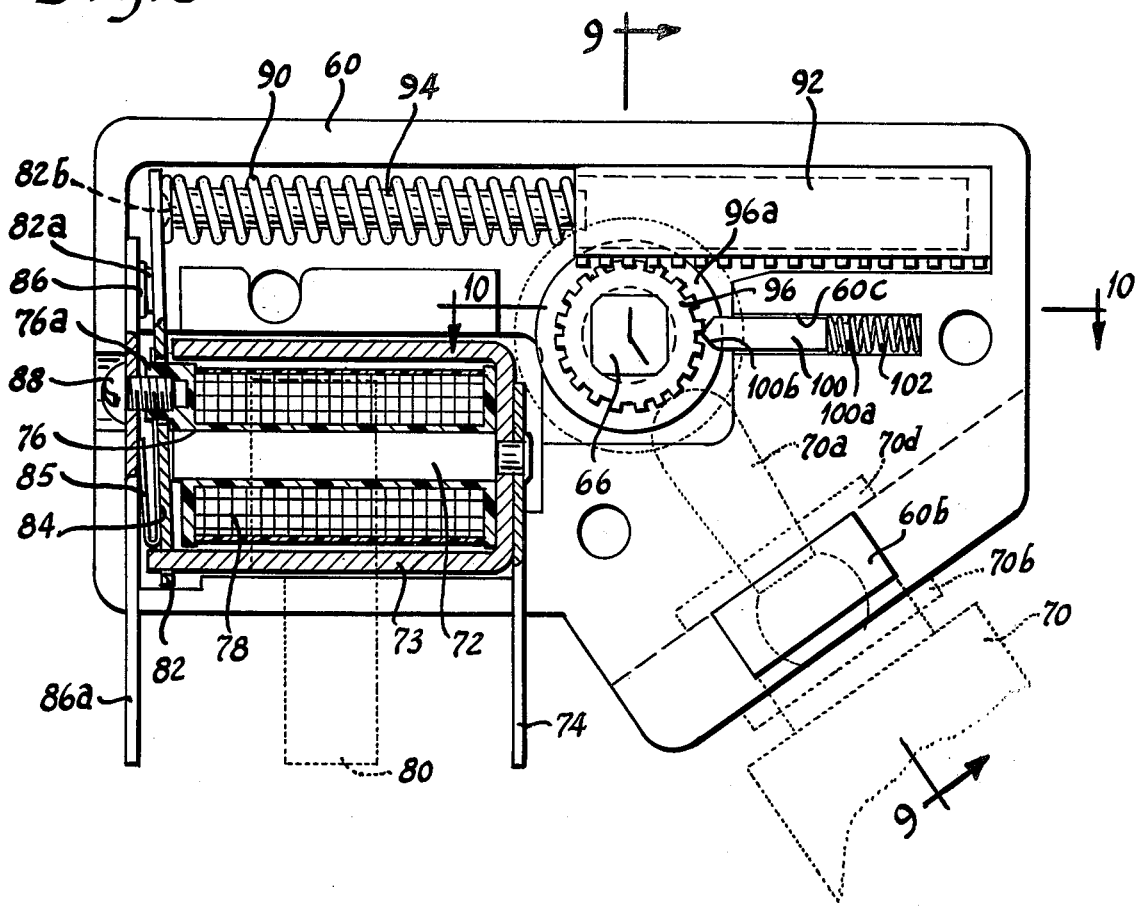
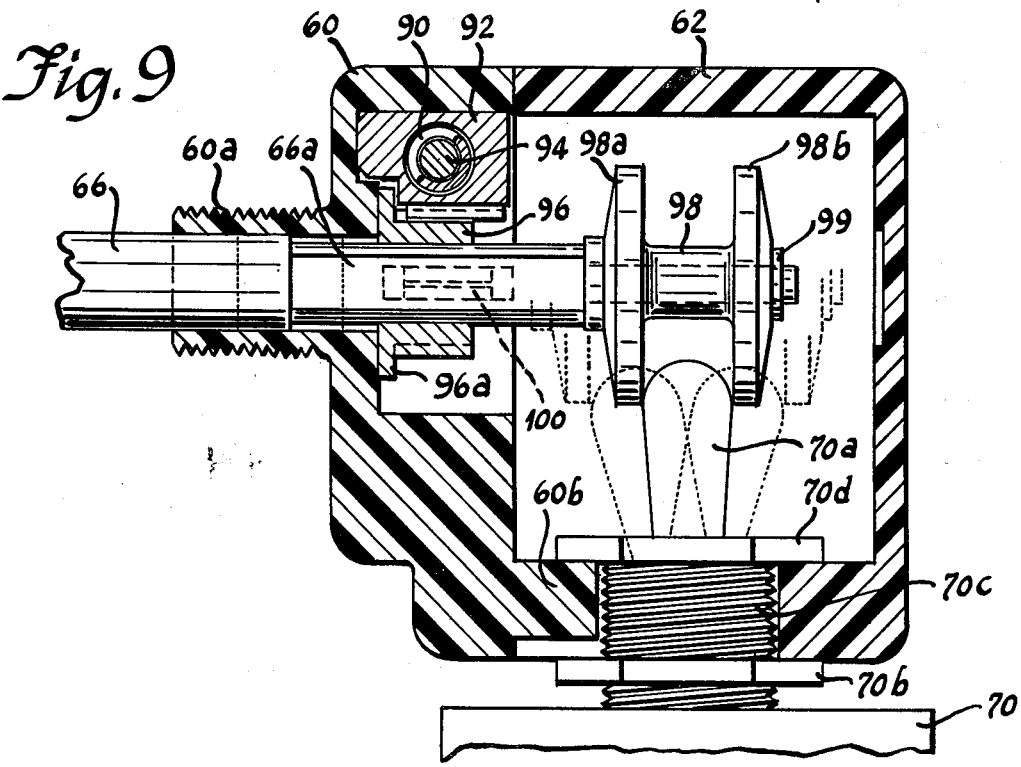

4,132,933

ELECTROMECHANICAL CHOPPER FOR SPEED CONTROL OF BATTERY POWERED DEVICES

BACKGROUND OF THE INVENTION

Vibratory type voltage regulators and motor speed controllers have been known heretofore. In such devices, magnetically vibratory contacts have been used to control the power output in accordance with the periodic closing of the contacts, such closing of the contacts being effective to shunt an impedance or the like from the output circuit, the closed-to-open time ratio of the contacts being adjusted by adjusting the spacing between the contacts. Such vibratory devices are operable from either A.C. or D.C. Magnetically operable choppers have also been known. One form of such chopper employs a rotating permanent magnet to oscillate a contact-carrying permanent magnet to close and open contacts. While such regulators, controllers and choppers have been useful for their intended purposes, this invention relates to a manually adjustable and controllable chopper for motor speed control.

SUMMARY OF THE INVENTION

An object of the invention is to provide an improved electromechanical chopper for speed control of battery powered devices.

A more specific object of the invention is to provide an improved chopper affording manually adjustable control of the closed-to-open time ratio of its contacts for control of the average output voltage.

Another specific object of the invention is to provide an improved electromechanical chopper affording trigger control of the speed of a portable electric tool.

Another specific object of the invention is to provide an improved D.C. electromechanical chopper affording trigger speed control of a portable electric drill.

Another specific object of the invention is to provide an improved electromagnetic chopper affording manual speed adjustment of a battery powered motor.

Another specific object of the invention is to provide an improved chopper speed control system of the aforementioned type exhibiting a limited amount of feedback.

Other objects and advantages of the invention will hereinafter appear.

BRIEF DESCRIPTION OF THE DRAWINGS

FIG. 3 is a lateral cross-sectional view taken substantially along line 3—3 of FIG. 2 to show the configuration of the electromagnet therein;

FIG. 4 is a lateral cross-sectional view taken substantially along line 4—4 of FIG. 2 to show the leaf spring and the magnet armature supported movable contact;

FIG. 5 is an elevational view of the stationary contact of the chopper of FIGS. 1-4;

FIG. 6 is a schematic circuit diagram showing connection of the chopper of FIGS. 1-5 to a battery source, reversing switch, motor load and battery charger; and FIGS. 7a-c show graphs illustrating typical operating characteristics of the chopper of FIGS. 1-6 controlling a permanent magnet field type D.C. motor;

FIG. 8 is an enlarged view of a knob controlled version of electromechanical chopper and of the base thereof with the cover removed; substantially along line 8—8 of FIG. 11, and being partly in section to show the internal parts thereof;

FIG. 9 is a lateral cross-sectional view taken substantially along line 9—9 of FIG. 8 to show the operating shaft carried on-off switch actuator;

FIG. 12 is a circuit diagram for the chopper version of FIGS. 8-11.

DESCRIPTION OF THE PREFERRED EMBODIMENT

Figure 1:
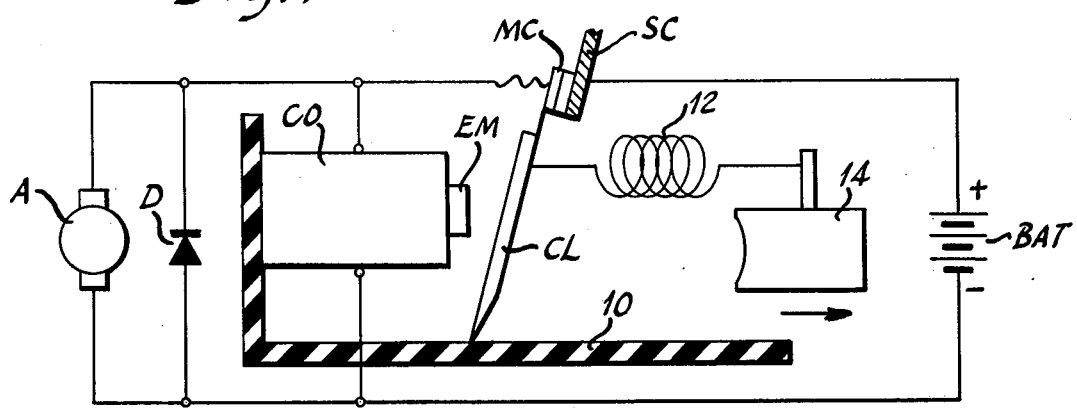
FIG. 1 is a schematic illustration of an electromechanical chopper incorporating tension spring force adjustability of the closed-to-open time ratio of its contacts.

Referring to FIG. 1, there is shown in schematic form an electromechanical chopper system constructed in accordance with the invention. As shown therein, a D.C. source such as a battery BAT has its positive side connected through a stationary contact SC and a movable contact MC and the coil CO of an electromagnet EM to the negative side of the battery. The armature A of an electric motor is connected across coil CO. A unidirectionally conducting diode D is connected across armature A and its polarity is such as to block any downward current flow therethrough normally coming from the battery to the motor but to allow upward current flow therethrough in response to the induced voltage of the motor.

Electromagnet EM is provided with stationary mounting means. This means comprises a member 10 to which this electromagnet is rigidly secured.

Movable contact MC is secured to the end of a magnetic clapper CL or magnet armature that is pivotally mounted at its lower end onto stationary mounting member 10 so that its upper end which carries the contact element may be moved by force of spring 12 into contacts-closed position as shown in FIG. 1. Alternatively, movable contact MC may be moved by attractive force of electromagnet EM into contacts-open position with respect to stationary contact SC whenever coil CO is energized.

The chopper system of FIG. 1 is also provided with means for closing the contacts and for adjustably controlling the periodic closed dwell time of the contacts with respect to the alternate open time thereof or, in other words, for manually adjusting and steplessly varying the closed-to-open time ratio or duty cycle of the contacts. This means comprises spring 12, a manual actuator 14 connected to one end of spring 12 while its other end is connected to clapper CL, and the aforementioned electromagnet EM.

While the D.C. supply is shown as a battery BAT, it will be understood that a battery pack, or one or a plurality of cells of NICAD type or the like, such as have been used in cordless drills, may be used therefor.

Figure 2:
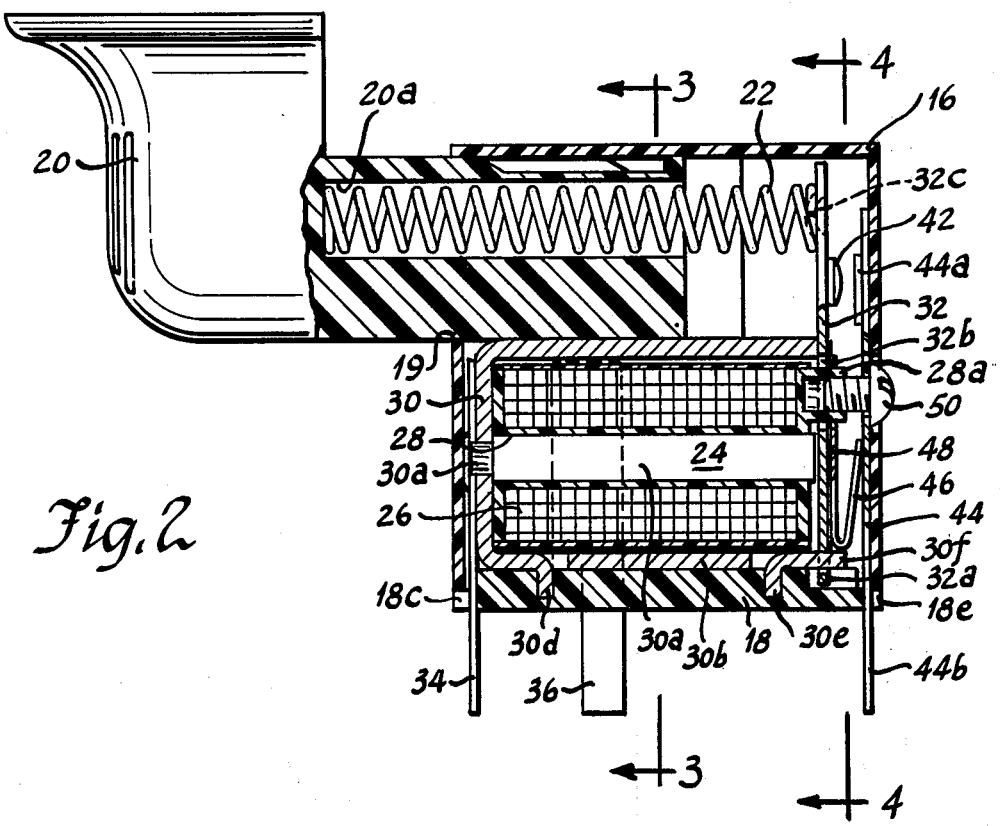
FIG. 2 is an enlarged vertical cross-section view of a trigger controlled version of electromechanical chopper incorporating compressive spring force adjustability of the closed-to-open time ratio of its contacts for battery powered portable tool speed control use.

While spring 12 is shown as a tension spring, it will be understood that other suitable types of springs including the compression springs shown in FIGS. 2 and 8 may be used for this purpose.

While contacts MC and SC in FIG. 1 have been shown closed, it will be understood that these contacts may be normally-open and closed by initial movement of actuator 14 or may be normally-closed if a separate on-off switch is provided in the battery connection for closing the circuit.

The operation of the chopper system of FIG. 1 will now be described. Initial depression of actuator 14 in the right-hand direction indicated by the arrow closes contacts MC and SC. This causes unidirection current to flow from battery BAT through these closed contacts to armature A to start the motor. At the same time, current flows from the battery through coil CO of electromagnet EM in parallel with the motor. When the current in the coil rises to a sufficient magnitude, the magnetic force of the electromagnet overcomes the restraining force of spring 12 and attracts clapper CL to open the contacts. This disconnects the power from the motor and also from the electromagnetic coil. As a result, the pulling force of spring 12 again pulls open the clapper to reclose the contacts. This repeated closing and reopening of the contacts causes periodic voltage pulses to be applied to the motor to run the motor at a slow speed.

To increase the motor speed, actuator 14 is depressed further in the right-hand direction of the arrow. This causes the spring to apply greater pulling force to the closed contact MC. As a result, the current in the coil must reach a higher value in order to open the contacts. This is because a larger magnetic force is now required to overcome the greater tension of the spring. As a result, the contacts remain closed for a longer period of time. And when the contacts finally open to cause deenergization of the coil, the contacts reclose sooner on collapse of the magnetic field due to the greater spring force now being applied on the clapper and faster decay of coil current. Thus, depression of actuator 14 steplessly increases the closed-to-open time ratio of the contacts to apply wider, closer together periodic voltage pulses to the motor, increasing the average voltage applied to the motor and thereby increasing the motor speed.

Letting up on the actuator causes spring 12 to retract it and to reduce the closing force being applied on the movable contact. This has the opposite effect with respect to that described above to reduce the motor speed.

FIGS. 2-6 show a trigger speed control version of the electromechanical chopper adapted to be mounted in the handle of a portable electric drill or the like. The drill housing also encloses the battery cells that supply the electric power for running the drill motor. This type of drill is known as a cordless electric drill since the power supply is self-contained and no electric cord is necessary to connect the drill to an electric outlet.

This trigger speed control version of a chopper comprises an insulating housing having an enclosing frame 16 open at the bottom and a generally flat base 18 snap-in mounted within and closing the opening at the bottom of the frame. For this purpose, the base has a pair of projections 18a and 18b on its left and right edges that snap into complementary holes near the lower edges of the frame as shown in FIG. 3 to lock the base to the frame. This frame is resilient enough to spread out as the base with its beveled projections is forced up into the base. The forward end of enclosing frame 16 has an opening 19 from which a trigger 20 extends out for depression by the forefinger of the user. A helical compression spring 22 biases the trigger outwardly into its normal off position and also serves a control function hereinafter described.

As shown in FIGS. 2-4, an electromagnet 24 is mounted on the base within the enclosing frame. This electromagnet comprises a coil 26 wound on an insulating bobbin 28 that is slipped onto and surrounds a square rod shaped ferrous metal core 30a. This core 30a is secured at one end centrally between the arms of a U-shaped ferrous metal magnetic member 30b thereby forming a generally E-shaped magnet frame 30 for magnetization by the coil and providing opposite polarity pole faces for attracting a pivotal magnet armature 32. For securing the core to the U-shaped member, the core is preferably formed with a reduced diameter hollow rivet 30c at one end that extends through a round hole in member 30b. Conveniently, this rivet-formed end of the core also extends through a similar round hole in a terminal 34 and is spun-over, or riveted, to rigidly secure the terminal, the U-shaped member and the core together as a subassembly. The four corners of core 30a are staked at the righthand end of the bobbin to rigidly secure the bobbin on the core.

The lower arm of this U-shaped member 30b is provided with a pair of sheared and downwardly bent, spaced projections 30d and 30e as shown in FIG. 2 that are thermally sunk into base 18 to be secured therein to fix the electromagnet on the base. Base 18 is provided at its forward end (left end in FIG. 2) with a centrally-disposed notch 18c providing clearance for terminal 34 to extend down therethrough so as to be accessible for connection to an external circuit. As shown in FIG. 3, the base is provided at its right side with a notch 18d providing clearance for a terminal 36 that extends down therethrough to be accessible for connection to an external circuit. This terminal 36 has a reduced width lower end portion so that the shoulder between its upper and lower portions seats on the base to retain it in position. As shown in FIG. 6, one end of coil 26 is connected by a stranded conductor 38 to terminal 34 while the other end of this coil is connected by a stranded conductor 40 to terminal 36, these connections being made by welding, soldering or the like.

Armature 32 is pivotally mounted to the magnet frame so that movable contact 42 carried by this armature is electrically connected through this armature and the magnet frame to terminal 34. For this purpose, the rear end of the lower arm of member 30b is provided with a reduced width portion 30f, as shown in FIGS. 2 and 4, that extends freely into a rectangular hole 32a in the lower end portion of armature 32 to pivot the armature onto this magnet frame member. This pivotal support allows the armature to be rocked by trigger spring force so that movable contact 42 engages contact element 44a of stationary contact 44, and allows the armature to be rocked back by magnetic attraction toward or into abutting engagement with the pole pieces at the rear end of the magnet frame. Armature 32 is held on its pivot by a bent-back leaf spring 46 interposed between armature 32 and stationary contact 44. A thin insulating layer 48 such as an insulating coating or insulating adhesive tape is placed on the rear surface of armature 32 to insulate leaf spring 46 therefrom. Armature 32 is provided at its midportion with a vertically-elongated hole 32b and leaf spring 46 is provided with a hole shown in FIGS. 2 and 4 providing clearance for a bushing 28a integrally molded with insulating bobbin 28, this bushing being adapted to receive a self-threading adjusting screw 50 for calibrating the device as hereinafter described. The upper end portion of armature 32 is also provided with a semi-spherical boss 32c on its forward surface as shown in FIGS. 2 and 4 for retaining the rear end of spring 22 in its position thereagainst and to prevent it from slipping off the armature, this boss being formed by upsetting with a die from the rear surface to form the boss on the front surface.

Stationary contact 44 shown in FIGS. 2 and 5 is a generally flat metal strip having the aforementioned contact element 44a welded to its front surface near its upper end. This contact is provided with a reduced width terminal portion 44b at its lower end that extends out through a suitable notch 18e (FIG. 2) in the rear end of base 18 with the shoulder 44c (FIG. 5) between its upper and lower portions being seated on the base to fix this contact in its position in the housing. This stationary contact is provided with a hole 44d near its midportion as shown in FIG. 5 through which screw 50 extends.

This screw 50 threads into plastic bushing 28a and is used to calibrate the device. Since core 30a is staked at the rear end of the bobbin as aforesaid, turning screw 50 will not cause the bobbin to slide along the core. Due to manufacturing tolerances of the parts and the like, this screw may be used to adjust the position of the stationary contact relative to the movable contact. This adjustment determines and sets the amount of trigger pretravel available before the contacts close. It will be apparent that turning screw 50 in moves stationary contact 44 closer to movable contact 42 and thus reduces the gap between the contacts. This reduces the amount of trigger pretravel that takes place before the contacts close.

Spring 22 serves not only as a return spring to restore the trigger to its normal off position following depression thereof but also as a resilient means for closing the contacts. For this purpose, helical spring 22 has its rear end lodged on boss 32c of the armature and has its forward end and the greater portion of its length extending into a hole 20a that extends forwardly from the rear end of the trigger. As shown in FIG. 2, the front end of spring 22 abuts the wall at the forward end of hole 20a so that when the trigger is depressed, this spring rocks the armature to close the contacts. For this purpose, as the trigger is depressed, spring 22 is partly compressed until it overpowers leaf spring 46 and then moves contact 42 into engagement with contact 44a. The amount of trigger pretravel provided before closing of the contacts is dependent first upon the relative strengths of springs 22 and 46 and secondly upon the adjustment of screw 50 which is a vernier adjustment of the device. Spring 46 is stronger than spring 22 to keep the contact normally open.

The trigger controlled chopper of FIGS. 2 to 5 may be used in a system such as shown in FIG. 6. As shown therein, the positive side of a battery 52 is connected to terminal 44b of stationary contact 44 and then through movable contact 42 and armature 32, frame 30 of the magnet, terminal 34, first forward contact of reversing switch 54, armature winding A of the motor, second forward contact of reversing switch 54 to the negative side of battery 52. A diode D like that in FIG. 1 is connected across the reversing switch and the motor. This diode is polarized to block normal motor energizing current from being shunted therethrough and conducts current in response to the induced voltage of the motor. Coil 26 of the electromagnet is connected across diode D so that it is also connected in series with contacts 42 and 44a across the battery.

A charging circuit for battery 52 is also shown in FIG. 6. This circuit comprises a half-wave rectifier D1 and a suitable value of voltage such as a 6 volt A.C. source from a transformer 56 or the like adapted to be connected to a conventional A.C. outlet, with this circuit being connected across battery 52 to charge the battery or to supply 6 volt rectified power to the chopper circuit in parallel with the battery. This 6 volt source is suitable for a battery pack of 5 cells of approximately 1¼ volts each.

The operation of the trigger controlled chopper system of FIGS. 2-6 will now be described with reference to the curves in FIGS. 7 a-c. The curves in FIG. 7a show operating characteristics of the chopper system for small depression of the trigger. The curves in FIG. 7b show what happens at medium trigger depression. And the curves in FIG. 7c show what happens at large depression of the trigger. Thus, these three sets of curves illustrate progressive steps of motor speed increase.

Curve Ia in FIG. 7a depicts generally the current in coil 26 with respect to time while curve Ea shows generally the ideal motor terminal voltage. As shown therein, each time the contacts are closed, the coil current rises rapidly, that is, it has a steep slope, from drop-out value DO to pick-up value PU. This steep slope is brought about by the large current forcing function presented to the RL circuit of the coil upon energization at small trigger depressions. During this time, full terminal voltage is applied to the motor as shown by the initial high value of curve Ea, this being a pulse of voltage.

At pick-up current value PU, the contacts open to disconnect the battery from both the motor and the coil. As a result, coil current Ia decays with a small slope. This small slope is brought about by the small current forcing function presented to the RL circuit of the coil upon deenergization at small trigger depressions. During this period, the induced voltage of the motor causes current to flow through diode D, this being depicted as a negative voltage Ea in FIG. 7a.

When the aforesaid induced voltage decreases so that the diode stops conducting, an opposite voltage appears across the motor.

When the coil current decreases to its drop-out value DO as shown in FIG. 7a, the contacts start to reclose under the force of spring 22. However, it takes some time for the armature to move to close the contacts. This dynamic interval is depicted by the level section of curve Ia in FIG. 7a.

When the contacts reclose, the coil current starts to rise as before and the motor terminal voltage increases to apply another voltage pulse to the motor.

The result of this small depression of the trigger is that narrow, low frequency voltage pulses are applied to the motor as shown in FIG. 7a by the low closed-to-open ratio of the contacts. This provides a low average voltage AV to the motor to run the motor at a slow speed.

To increase the motor speed, the trigger is depressed further to the medium condition depicted in FIG. 7b. This causes the coil current to rise but at a slower rate shown by the less steep slope of curve Ib in FIG. 7b. This smaller rising slope of curve Ib is due to the RL circuit of the coil being presented with a smaller current forcing function than occurred with small trigger depressions. At the same time, full terminal voltage is applied to the motor for a longer period before the coil current reaches pick-up value PU, thus providing a wider voltage pulse to the motor.

The frequency of the voltage pulses applied to the motor is also increased as shown in FIG. 7b. This is due to the steeper decay slope on coil current curve Ib because the RL circuit of the coil is being presented with a larger current forcing function than occurred with small trigger depressions. And because the coil current decays faster, the movable contact does not open as far as it did at small trigger depression before the coil current decreases to drop-out value DO. At this drop-out value of coil current, the contacts start to reclose. The level period of curve Ib is shorter because the dynamic closing of the contacts takes less time since the armature did not open as far and a greater spring force is acting to close the contacts. As a result, wider voltage pulses of higher frequency as shown by curve Eb are applied to the motor. This increases the average voltage AV applied to the motor to run the motor at a higher speed.

FIG. 7c shows further progression in motor speed increase. The slope of the coil current curve Ic from drop-out DO to pick-up PU is shallower because the RL circuit of the coil is being presented with a small current forcing function. This change in slope causes a widening of the voltage pulses applied to the motor as shown by curve Ec. Also, the space between the voltage pulses is reduced due to the increasing decay slope of curve Ic and reduction in the dynamic contact closing time. This has the effect of increasing the width and frequency of the voltage pulses applied to the motor, and consequently increasing the average value AV of the voltage applied to the motor to increase the motor speed.

This system provides a benefit that is not normally obtainable by a motor speed control of the variable resistor type or the like. This system provides a significant amount of feedback when a self-enclosed battery pack is used in the electric drill.

This feedback comes about as follows. When the load increases on the output shaft of the drill as in heavy drilling, the motor terminal voltage will remain almost constant even though the trigger is kept in the same position and battery voltage drops due to loading. This is because the increased current load on the batteries in the tool housing will cause a proportional reduction in battery voltage. This reduced voltage will result in less pull-in force on armature 32 in FIG. 2 and, therefore, will allow the contacts to remain closed for a longer period of time each time that they close which increases the length of the voltage pulses to the motor. This has a self-regulating effect to keep the motor terminal voltage, and thus to a certain extent the motor speed, somewhat constant for varying load conditions. This feedback comes about when the power source such as five cells within the handle is not adequate to maintain a constant voltage under heavy load conditions. A "stiff" supply would not function this way unless the motor and coil voltages are obtained through some component such as a resistor that will cause a change in voltage with the current through it.

The knob controlled version of electromechanical chopper is shown in FIGS. 8–12. As shown in external view in FIG. 11, this device comprises an insulating housing having a base 60 and a cover 62 connected together by a plurality of screws 64a–c. The base is provided with a threaded bushing 60a by which the chopper assembly may be mounted in a hole in a mounting panel and through which extends a rotary operating shaft 66 having a suitable knob 68 secured by a set screw or the like to its external end. A toggle switch 70 is mounted in cover 62 with its toggle lever on the inside and its base on the outside.

Figure 11:
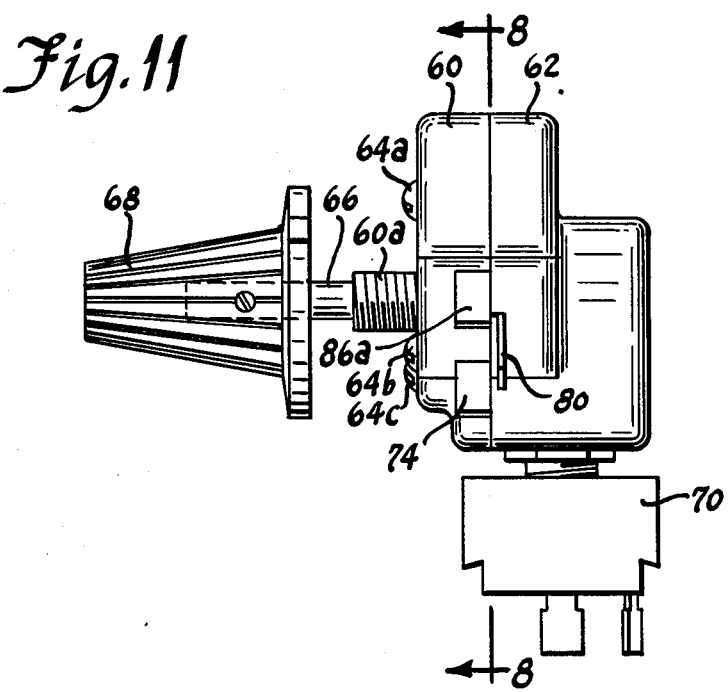
FIG. 11 is an external elevational view of the chopper of FIGS. 8-10 to show the housing and operating shaft configurations as viewed from the lower-left direction of FIG. 8.

FIG. 8 shows the chopper structure with cover 62 removed and with the electromagnet in section and with one of the coil terminals and the toggle switch in phantom lines. The electromagnet in this version is substantially similar to that in FIG. 2 except for relative dimensions of parts. This electromagent comprises an E-shaped magnet frame having an elongated square core 72 riveted at one end through a hole in a U-shaped magnet member 73 and through a hole in a coil terminal 74. This core is surrounded by a bobbin 76 secured thereto and having a coil 78 wound thereon as in FIG. 2. One end of this coil is connected to terminal 74 and its other end is connected to a terminal 80 shown in phantom lines in FIG. 8 since it is actually above the coil and fits into a notch in cover 62 as shown in FIG. 11.

Movable contact element 82a is mounted on magnet armature 82 and this armature is pivotally supported on the end of the lower arm of magnet member 73 as hereinbefore described in connection with FIGS. 2–4. The left surface of the armature is insulated by a coating, tape or film 84 and a bent-back leaf spring 85 bears on this insulator film to bias the movable contact in a direction away from stationary contact 86. An adjusting screw 88 extends through a hole in stationary contact 86 and is self-threaded into bushing 76a which is an integral part of the coil bobbin. Leak spring 85 has a hole near its upper end through which this bushing 76a extends.

Armature 82 that carries the movable contact element 82a is provided with a boss 82b at its upper end to retain the left end of helical spring 90 thereon. The other end of spring 90 extends into a hole in driven rack 92, there being a pin 94 within helical spring 90 to keep it from buckling. Spring 90 is stronger than spring 85 so as to bias the contacts normally closed.

As shown in FIGS. 8 and 9, rack 92 is arranged to slide within the base and is provided with a plurality of linear teeth on its lower surface whereby it is driven by a rotary driving gear 96 coupled to shaft 66. For coupling this gear to rotate with the shaft, the shaft has a square section 66a where it passes through a complementary square hole in gear 96. This gear has a flange 96a and rack 92 has a cutout portion into which such flange fits freely. In this manner, the rack retains the gear from moving out from beneath the rack when the shaft is moved axially to operate the toggle switch as hereinafter described.

Figure 10:
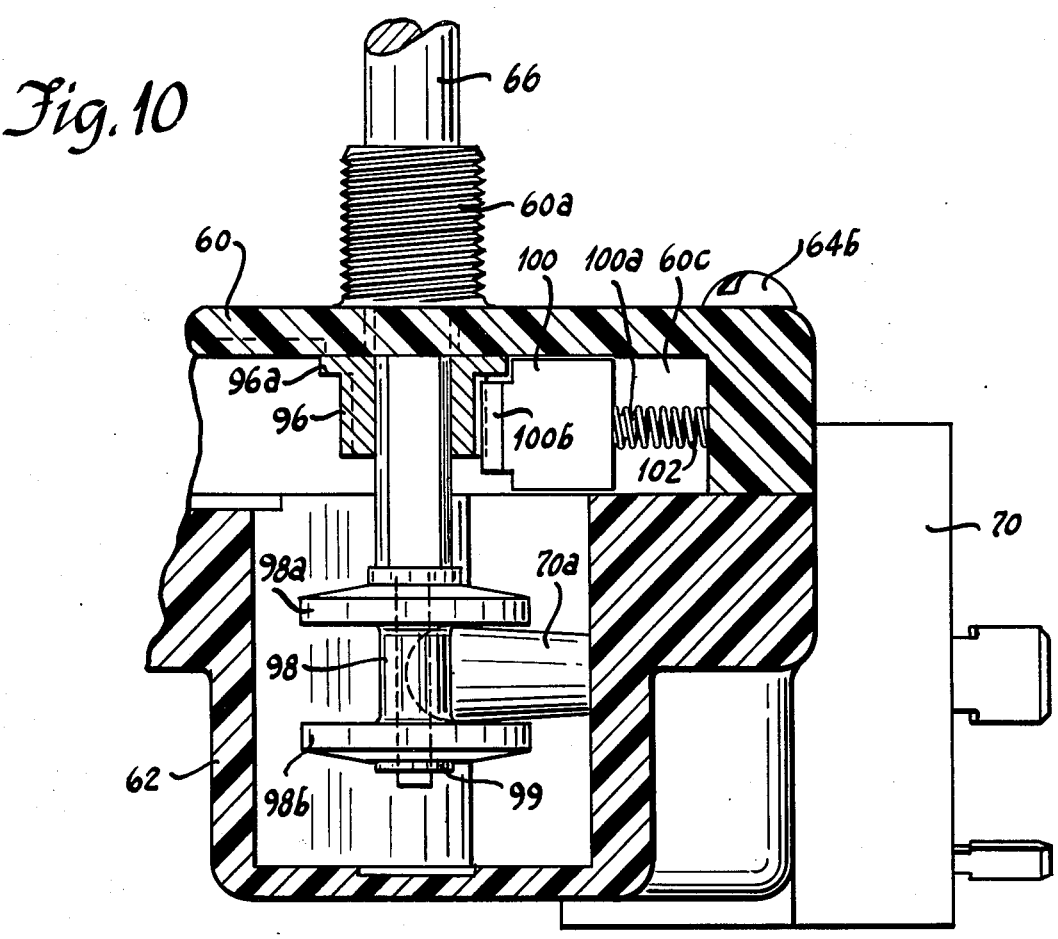
FIG. 10 is a partial horizontal cross-sectional view taken substantially along line 10—10 of FIG. 8 to show the detent in relation to the rotary operating mechanism.

The internal end of shaft 66 is provided with means for operating toggle lever 70a of toggle switch 70 as shown in FIGS. 9 and 10. This means comprises a molded spool 98 attached to the end of the shaft so that the end of toggle lever 70a extends between the two annular flanges 98a and 98b of this spool. To attach the spool to the shaft, the shaft is provided with a reduced diameter, round end portion and an annular groove around the extreme end thereof for a split-ring retainer 99. This reduced end portion extends through the hole in the spool and the split-ring is snapped into the groove to retain the spool on the shaft.

As shown in FIG. 9, toggle switch 70 is mounted on cover 62 by a pair of nuts. A first nut 70b is threaded on bushing 70c of the toggle switch. The bushing is then inserted through a slot in the cover and a second nut 70d is threaded on the end of the bushing and tightened to clamp the switch to the cover. Base 60 is provided with a suitable projection 60b as shown in FIGS. 8 and 9 to fill the remainder of the slot in the cover up to the toggle switch bushing when the housing parts are assembled.

A detent mechanism is provided for retaining the gear in any angular position to which it is set by the shaft. As shown in FIGS. 8 and 10, base 60 is provided with a slot 60c spaced from and extending radially with respect to gear 96. A flat detent 100 is slidably positioned in this slot and is biased toward the gear by a helical bias spring 102 within this slot, there being a small diameter stud 100a on the rear end of the detent for retaining spring 102 centered thereon as shown in FIG. 10. The front end of detent 100 is provided with a converging flat tip 100b suitably dimensioned to engage between the teeth of gear 96 and to hold this driving gear in any rotary position in which it is set, this tip being of reduced width to provide clearance for flange 96a, FIG. 10.

Toggle switch 70 is a three position switch having forward and reverse positions as shown in broken lines in FIG. 9 and a center off position as shown in solid lines in FIG. 9. These three positions are also shown schematically in the circuit diagram in FIG. 12.

This circuit diagram in FIG. 12 shows how this chopper may be connected to a D.C. source such as a battery and a motor load. The positive side of battery 104 is connected to terminal 86a of stationary contact 86 and then through the movable contact 82a and magnet armature 82 and magnet frame 73 and terminal 74 to the cathode of diode D, the anode of this diode being connected to the negative side of the battery. The center OFF terminals of toggle switch 70 are connected across diode D. Coil 78 of the electromagnet and armature A of the motor load are connected in parallel across forward terminals FOR of the toggle switch, these forward terminals being connected criss-cross to reversing terminals REV of the toggle switch. An arc suppressing capacitor C is connected across the chopper contacts to reduce contact degradation.

The operation of the chopper of FIGS. 8–12 will now be described. Spring 90 is stronger than leaf spring 85 so that contacts 82a and 86 are normally closed. Knob 68 is initially pushed to operate the toggle switch from its center off position to its forward position. This connects the battery to coil 78 and to the motor. The coil energizes and opens contact 82a. As a result, a voltage pulse has been applied to the motor. This function is generally similar to that described in connection with the curves in FIG. 7a.

To increase the motor speed, the knob is turned counter-clockwise in FIG. 8 to cause gear 96 to drive rack 92 in the left-hand direction. As a result, spring 90 is compressed to increase the force applied to the movable contact. Detent 100 holds the gear in its set position. This causes an increase in the width and frequency of the voltage pulses applied to the motor, and increases the motor speed.

To run the motor in the reverse direction, the knob is turned clockwise to slow speed and the knob is pulled to close reverse contacts REV in FIG. 12. The knob is then turned counter-clockwise to increase the motor speed.

While the apparatus hereinbefore described is effectively adapted to fulfill the objects stated, it is to be understood that the invention is not intended to be confined to the particular preferred embodiments of electromechanical choppers for speed control of battery powered devices disclosed, inasmuch as they are susceptible of various modifications without departing from the scope of the appended claims.

We claim:

1. A D.C. electrical control system for controlling energization of a portable load from a storage battery comprising:
   an electro-responsive chopper device comprising contact means connected in circuit with said portable load and said storage battery for controlling the average voltage applied to said portable load during use;
   manual means for applying resilient closing force to said contact means and for selectively varying the magnitude of said closing force thereby to correspondingly vary the closed-to-open ratio of said contact means and the average voltage applied to said portable load;
   said chopper device also comprising electromagnetic means in circuit with said contact means and said storage battery, said electromagnetic means energizing when each closure of said contact means applies storage battery voltage thereto to cause reopening of said contact means to disconnect said storage battery voltage from both said portable load and said electromagnetic means whereby said contact means passes voltage pulses to said portable load having a variable average value selectively controllable by said manual means to control energization of said portable load.

2. The D.C. electrical control system claimed in claim 1, wherein:
   said contact means comprises a stationary contact element and a movable contact element for closing with said stationary contact element under the control of said manual means;
   and said chopper device further comprising calibrating means for adjusting the position of one of said contact elements with respect to the other contact element.

3. The D.C. electrical control system claimed in claim 1, wherein:
   said chopper device comprises a trigger switch type housing enclosing said electromagnetic means and said contact means;
   and said manual means comprises a trigger mounted for reciprocal movement on said housing and a spring between said trigger and said contact means within said housing for applying said resilient closing force to said contact means when said trigger is actuated and for restoring said trigger to its normal position upon release thereof.

4. The D.C. electrical control system claimed in claim 3, wherein:
   said trigger is an in-line movable trigger slidably mounted in said housing;
   and said spring is a compression spring extending from said trigger to engage said contact means.

5. The D.C. electrical control system claimed in claim 1, wherein:

said electromagnetic means comprises a magnetic frame, a coil mounted on said frame and connected in series with said contact means across said storage battery, and a magnetic armature pivoted on said frame and connected for opening said contact means.

6. The D.C. electrical control system claimed in claim 1, wherein:
said chopper device comprises resilient means for maintaining said contact means normally open;
and said manual means comprises a speed control actuator operable upon initial movement for closing said contact means and operable upon further movement for progressively increasing said closing force on said contact means to increase the width of said voltage pulses and correspondingly increase energization of said portable load.

7. The D.C. electrical control system claimed in claim 6, wherein:
said speed control actuator comprises a trigger and a compression spring extending from said trigger into engagement with said contact means.

8. The D.C. electrical control system claimed in claim 1, wherein:
said manual means comprises a speed control actuator and a spring extending from said actuator for maintaining said contact means normally closed;
and said control system also comprises an on-off switch operable by initial manipulation of said actuator for connecting said storage battery through said normally closed contact means to said portable load and to said electromagnetic means.

9. The D.C. electrical control system claimed in claim 1, wherein:
said manual means comprises a speed control actuator and a tension spring extending from said actuator to said contact means to apply said resilient force thereto.

10. A speed control system for a cordless portable electric motorized tool having a tool housing including a handle portion comprising:
a portable D.C. power supply comprising battery cells mounted within said housing;
and a self-enclosed, trigger-controlled electroresponsive chopper mounted in said handle portion with the trigger extending out therefrom for actuation by the user to control the motor speed, said chopper comprising:
a pair of contacts;
an electromagnet comprising a coil and a movable armature arranged to open a first one of said contacts from the second contact;
means connecting said contacts in circuit with said motor and said coil and being effective when closed to apply a voltage pulse from said battery cells to said motor and also to said coil to cause said electromagnet to open said contact;
and an operating spring controlled by said trigger for applying variable resilient closing force to said first contact to vary the closed-to-open time ratio of said contacts thereby to correspondingly vary the width of the voltage pulses applied to the motor, the average voltage applied to the motor and the speed of the motor.

11. The speed control system for a cordless portable electric motorized tool claimed in claim 10, wherein:
said self-enclosed, trigger-controlled electro-responsive chopper is substantially the size and shape of a conventional trigger switch to fit in the handle of a portable electric drill and said trigger is an in-line slidable trigger.

12. The speed control system for a cordless portable electric motorized tool claimed in claim 10, wherein:
said operating spring extends from the rear end of said trigger into engagement with said first contact;
and said chopper also comprises a second spring normally maintaining said contacts open but capable of being overpowered by said operating spring on initial trigger depression to close said contacts followed by increasing the closing force on said contacts upon further trigger depression.

13. The speed control system for a cordless portable electric motorized tool claimed in claim 10, wherein:
said battery cells consist of a dry cell battery pack the voltage of which drops under heavy load on the tool thereby causing the chopper to widen the voltage pulses applied to the motor to afford feedback tending to maintain the motor speed somewhat constant.

14. The speed control system for a cordless portable electric motorized tool claimed in claim 10, wherein said chopper also comprises:
resilient means for maintaining said contacts normally open;
and calibrating means for adjusting the initial spacing of said contacts against the force of said resilient means.

15. The speed control system for a cordless portable electric motorized tool claimed in claim 14, wherein said chopper further comprises:
an insulating bobbin on which said coil is wound;
and said calibrating means comprises a screw extending through a hole in said second contact and threaded into said insulating bobbin to adjust the initial spacing of said second contact from said first contact.

16. A speed control system for a portable electric motorized device comprising:
a portable D.C. power supply comprising a storage battery;
and a self-enclosed, manual actuator controlled electroresponsive chopper with its manual actuator extending out from its housing for actuation by the user to control the motor speed, said chopper comprising:
a pair of contacts;
an electromagnet comprising a coil and a movable armature arranged to open said contacts;
means connecting said contacts in circuit with said motor and said coil and being effective in closed condition to apply a voltage pulse from said storage battery to said motor and also to said coil to cause said electromagnet to open said contacts;
and means comprising an operating spring controlled by said actuator for initially closing said circuit and for applying variable resilient closing force to said contacts to vary the closed-to-open ratio of said contacts thereby to correspondingly vary the width of the voltage pulses applied to the motor, to proportionally vary the average voltage applied to the motor and the motor speed.

17. The speed control system for a portable electric motorized device claimed in claim 16, wherein said means comprising an operating spring controlled by said actuator for initially closing said circuit and for applying variable resilient closing force to said contacts also comprises:

an on-off switch operable by first movement of said actuator for closing said circuit through said contacts, and said operating spring being compressible by second movement of said actuator for increasing the resilient closing force on said contacts.

18. The speed control system for a portable electric motorized device claimed in claim 17, wherein:

said actuator is an axially-reciprocal rotary shaft having a knob;

and said first movement is an axial movement of said shaft.

19. The speed control system for a portable electric motorized device claimed in claim 18, wherein said means comprising an operating spring controlled by said actuator for initially closing said circuit and for applying variable resilient closing force to said contacts also comprises:

a gear driven by rotary motion of said shaft;

and a rack driven by said gear for compressing said operating spring to set said chopper at a desired speed point.

20. The speed control system for a portable electric motorized device claimed in claim 19, wherein said means comprising an operating spring controlled by said actuator for initially closing said circuit and for applying variable resilient closing force to said contacts also comprises:

a spring-biased detent engaging said gear to retain said chopper at the selected speed point.

21. The speed control system for a portable electric motorized device claimed in claim 16, wherein:

said contacts are normally closed by said operating spring and open upon energization of said coil.

22. The speed control system for a portable electric motorized device claimed in claim 16, wherein:

a first one of said contacts is movable by said actuator controlled operating spring to close against the second contact;

said second contact is mounted in said housing;

and said chopper also comprises calibrating means for adjusting the initial position of said second contact with respect to said first contact.

* * * * *